United States Patent [19]

Hendrick

[11] 4,039,160
[45] Aug. 2, 1977

[54] FILM TRANSPORT SYSTEM

[76] Inventor: John Burton Hendrick, 709 NW. 19 Ave., Gainesville, Fla. 32601

[21] Appl. No.: 678,605

[22] Filed: Apr. 20, 1976

[51] Int. Cl.² .................. B65H 25/04; B65H 25/22; G03B 1/18
[52] U.S. Cl. .................. 242/189; 242/75.43; 242/204; 242/205
[58] Field of Search .............. 242/189, 204, 210, 205, 242/75.43, 75.4, 75.42, 156, 156.2, 67.4

[56] References Cited

U.S. PATENT DOCUMENTS

| | | | |
|---|---|---|---|
| 2,005,738 | 6/1935 | Foster et al. | 242/189 |
| 2,094,581 | 10/1937 | Bundick et al. | 242/189 |
| 2,405,637 | 8/1946 | Behrens | 242/75.43 |
| 3,584,807 | 6/1971 | Smith | 242/205 |

Primary Examiner—George F. Mautz
Attorney, Agent, or Firm—Dennison, Dennison, Meserole & Pollack

[57] ABSTRACT

A film transport system, usable in conjunction with a standard projector incorporating a feed reel and a take-up reel, both of which utilize a braking system providing a continuous drag on the reels. The take-up reel is motor driven and provides, in the braking system, a linkage control whereby the continuous drag will release upon release of the film from the projector.

8 Claims, 6 Drawing Figures

FILM TRANSPORT SYSTEM

The present invention generally relates to a transport system for film, and is more particularly concerned with a system, usable in conjunction with a standard movie theater projector, which effectively accommodates substantial lengths of film to enable, as an example, the non-stop running of a full length movie without requiring reel changes and while at the same time utilizing a single projector.

It is the primary object of the invention to provide a transport system which constitutes a significant advance over what has heretofore been proposed in regard to the operating capability of the system, the unique simplicity of the construction involved, and the high degree of dependability achieved.

Basically, the objects of the invention are achieved through the utilization of separate feed and take-up reels in conjunction with the film drive means of a projector wherein each reel is provided with an independent braking system including a brakeshoe in continuous contact to provide a constant drag during the film transporting operation. Each brakeshoe is controlled by a unique biased linkage assembly mounting a film guiding roller to provide for a continuous monitoring of the film being transported. The take-up reel is motor driven through a belt adapted for selective slipping in response to the braking action.

Additional objects and advantages will become apparent from the following detailed description of the construction and operation of the invention. Reference is had to the accompanying drawings forming a part hereof wherein like numerals refer to like parts throughout, and in which.

Figure 1:
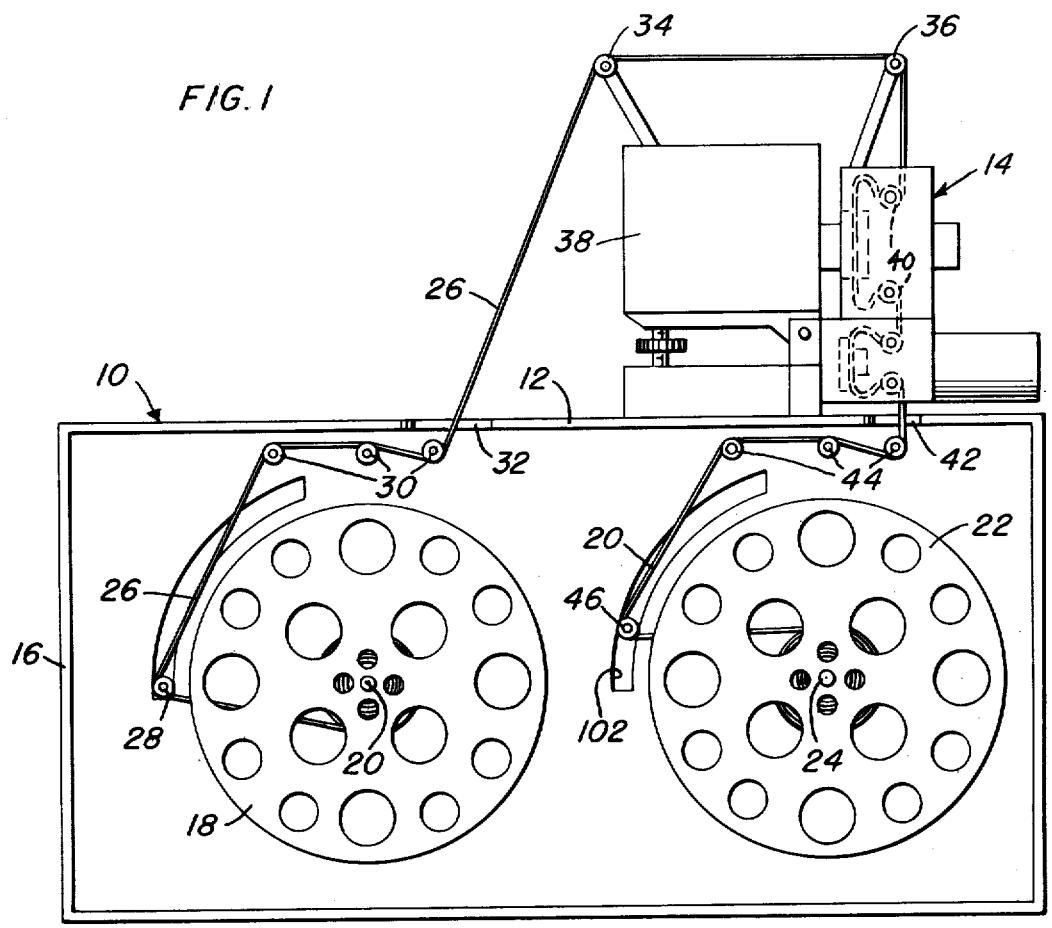
FIG. 1 is an elevational view of the transportation system operatively positioned with regard to an associated projector.
Figure 2:
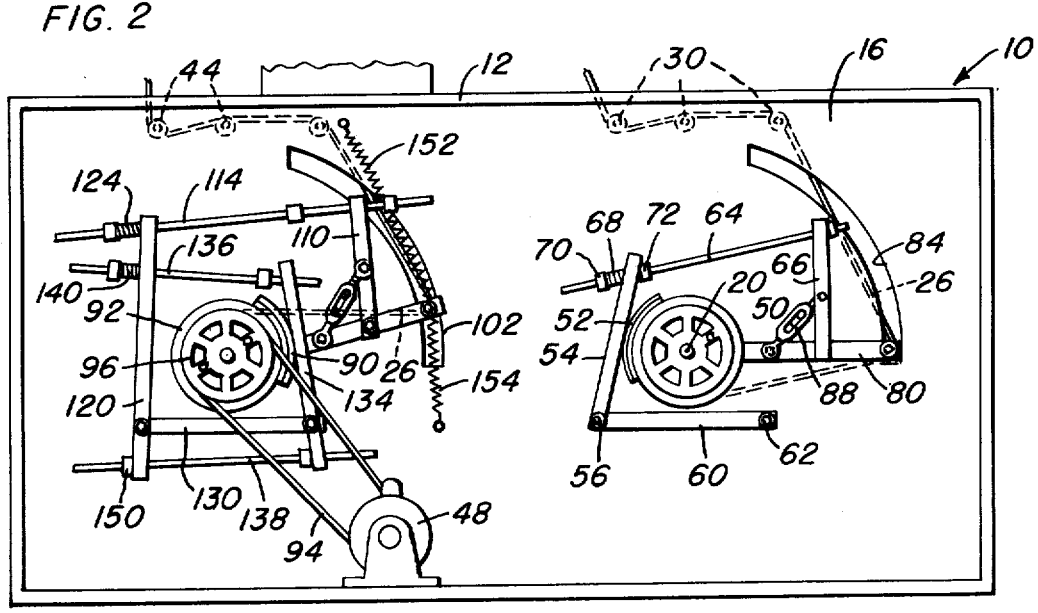
FIG. 2 is a rear elevational view showing the control systems for the reels.

Referring now more specifically to the drawings, the film transport system will normally be provided within a housing 10 having a top wall 12 upon which a standard 35 millimeter movie theater projector 14 will mount in operative position. The housing 10 also incorporates a vertical wall 16 providing a support base for the various components of the transport system.

With reference to FIG. 1 in particular, the transport system includes a rear enlarged feed reel 18 keyed to a central shaft 20 for rotation therewith, and a second enlarged front take-up reel 22 keyed to shaft 24 for rotation therewith. The film 26 extends from the feed reel 18 rearwardly about control roller 28 and from there upwardly and forwardly so as to engage over and about a plurality of guide rollers 30 which ultimately direct the film vertically through an opening in the top wall 32 of the housing 10. A pair of bracket mounted rollers 34 and 36 receive and guide the film upwardly over the projector 14, care being taken so as to allow the film to clear the lamp house 38 of the projector 14 and properly align with the various internal sprockets 40 which guide and drive the film through the projector by appropriate self-contained motor means.

The film discharges downwardly from the projector 14 through a second top wall opening 42 for guided reception over a second series of transport system guide rollers 44 which direct the film rearwardly. The film 26, from the guide rollers 44, extends downwardly and rearwardly about a second control roller 46 and subsequently turns forwardly for engagement about the central or hub portion of the reel 22. It is believed that the path taken by the film will be readily apparent from FIG. 1 with the movement of the film 26 from the feed reel 18 to and through the projector 14 being effected by the internally driven projector motor sprocket engaging and driving the film as with conventional reel mounted film. The reeling of the film on the take-up reel is in turn provided for by an independent drive motor 48 associated therewith as shall be explained in more detail presently.

As indicated supra, inasmuch as substantial lengths of film are to be accommodated, specific means have been devised so as to control rotation of the two reels so as to ensure a smooth transport of the film without the generation of such forces therein as could result in film damage. This is effected primarily through the provision of means effecting a constant drag on both the feed reel 18 and the take-up reel 22 with the only release of the drag on the feed reel being effected upon the introduction of excess tension in the film 26 itself and with the drag on the take-up reel being reduced or removed only upon a substantial slacking of the film 26, for example, by a release thereof from the projector.

With regard to the feed reel 18, the associated central shaft 20 extends through the support base or wall 16 and is rotatably mounted thereon by an appropriated flanged bearing housing bolted to the base 16. The shaft 20 projects substantially rearward of the support base 16 and has an enlarged friction wheel 50 mounted thereon for rotation therewith.

Figure 5:
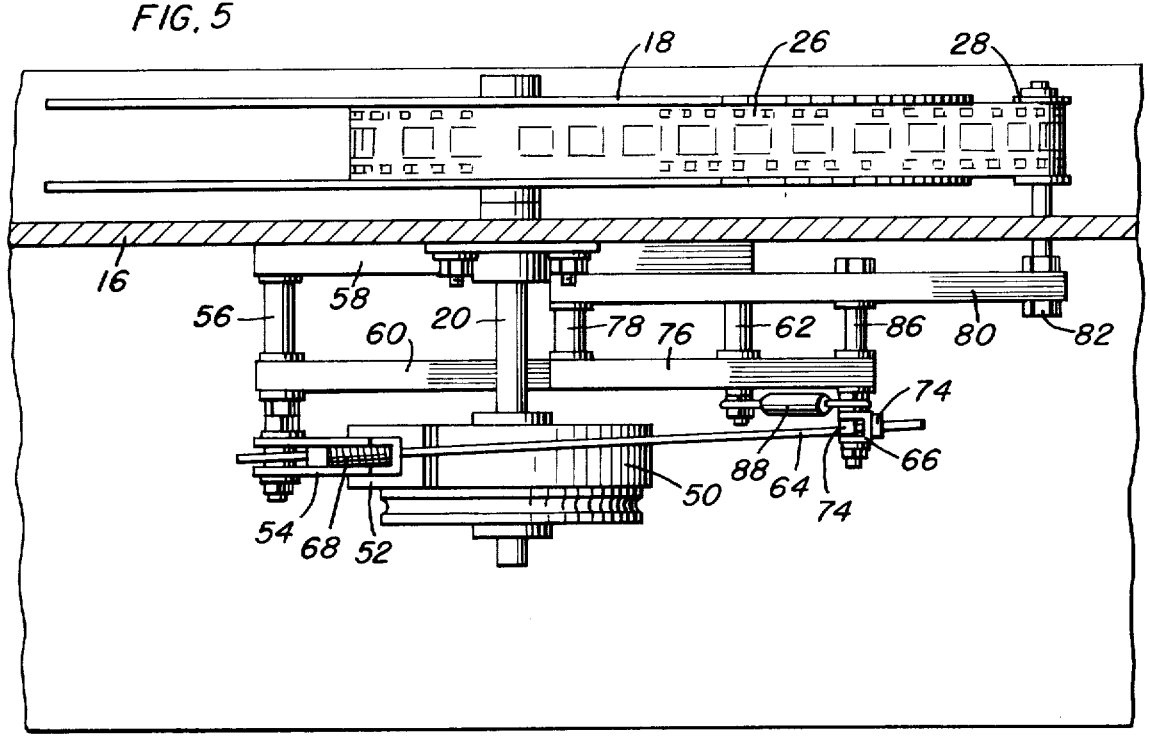
FIG. 5 is a top view of the feed reel and the associated control system.
Figure 6:
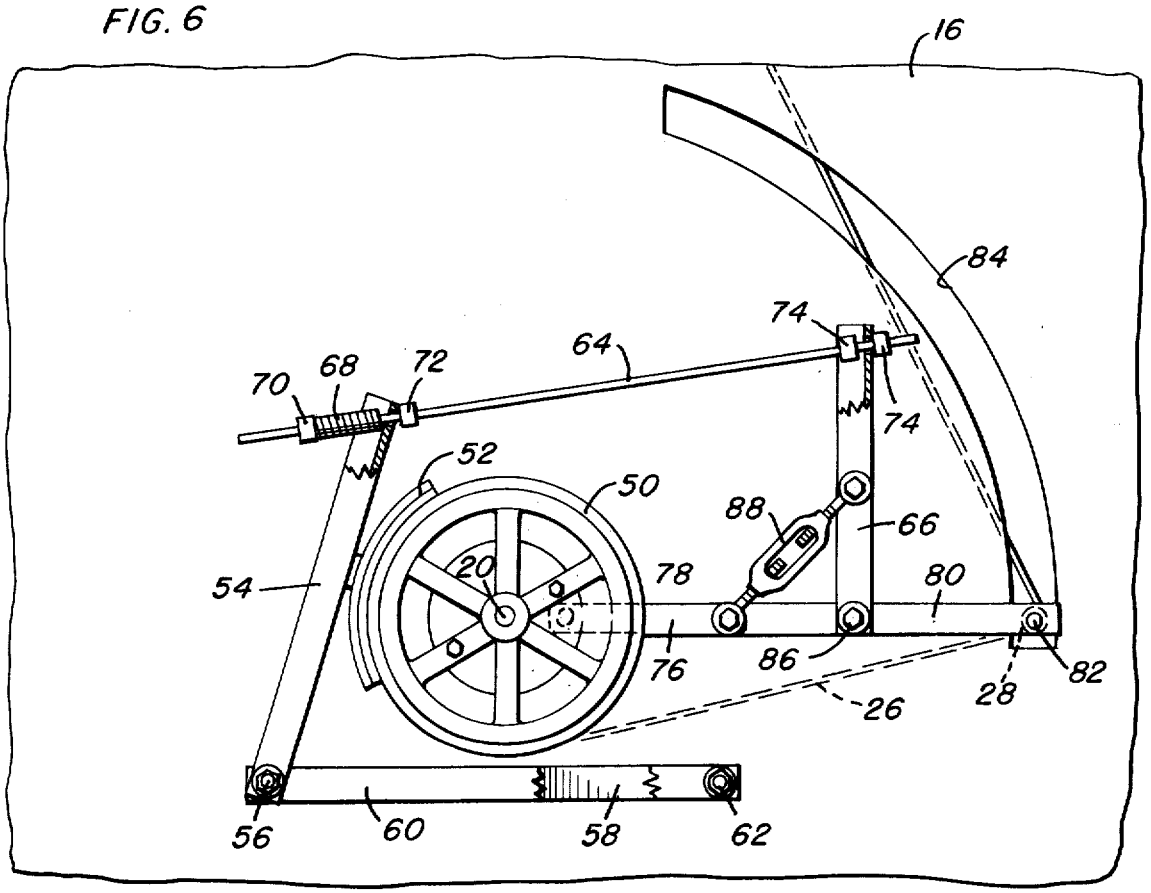
FIG. 6 is an elevational view detailing the linkage assembly associated with the feed reel control system.

The continuous drag or braking effect desired in conjunction with the feed reel 18 is produced by engagement of an enlarged arcuate brakeshoe 52 with the outer periphery of the friction wheel 50. The brakeshoe 52 is fixed to the side of an elongated channel member link 54 pivoted, at its lower end, on a support post 56 which is in turn rigidly orientated on the base 16 against lateral shifting by means of a pair of elongated channel members 58 and 60 through which the pivot post 56 extends. With reference to FIG. 5 in particular, it will be noted that the inner channel member 58 is positioned flush against the base 16 and is affixed directly thereto. The member 60 is orientated outward therefrom and in parallel overlying relation thereto. Both of the members 58 and 60 extend horizontally below the shaft 20 and have the remote ends thereof also rigidly interconnected by appropriate post means 62.

The upper end of the link 54, or that end remote from the pivot 56, is connected by an elongated rod link 64 to the upper end of a channel member link 66 located to the opposite side of the shaft 20 and wheel 50 from the link 54. The link 54 is spring biased laterally to engage the brakeshoe 52 against the wheel 50 by means of a compression spring 68 mounted on the rod 64 and retained for engagement with the face of the link 54 laterally outward of the wheel 50 by an appropriate collar 70. A second positioning collar 72 is located to the opposite side of the link 54 which accommodates the rod 64 being slightly enlarged so as to enable a pivotal relationship between the rod 64 and the link 54. The second end of the rod 64 is received through a slightly enlarged aperture in the upper end of the link 66 and is positioned relative thereto by means of a pair of rod mounted collars 74.

The lower end of the link 66 is pivoted to the end of link 76 which projects generally radially inward of the wheel 50 for engagement with a pivot post 78 fixed to the base 16. This pivot post 78 also pivotally mounts the inner end of elongated link 80 which projects radially outward, below and parallel to link 76, to terminate in a free outer end mounting a forwardly projecting elongated shaft 82 which in turn mounts the control roller 28 to the opposite or forward side of the base 16. In order to accommodate this shaft 82, and any anticipated swinging movement of the link 80, an appropriate elongated arcuate slot 84 will be provided through the base 16. The links 76 and 80 are also interconnected by the pivot post 86 through which the lower end of the link 66 is affixed to the link 76. Thus, it will be appreciated that the links 76 and 80 act in unison. Finally, an adjustable turnbuckle 88 interconnects the links 66 and 76 at spaced points from the pivot post 86 so as to vary the angular relationship therebetween and affix the links in an adjusted angular position to vary the initial predetermined bias to the spring loaded brakeshoe carrying link 54 through the rod link 64.

The manner in which the links 76 and 80 cantilever outward from the pivot post 78, in addition to the weight added thereto by the orientation of the remaining links, causes a downward biasing thereof so as to provide for a continuous engagement of the brakeshoe 52 against the friction wheel 50, cushioned by the action of the compression spring 68. In this manner, a continuous, substantially constant drag is provided on the associated feed reel 18.

As will be appreciated, the film 26 feeding off the feed reel 18 will engage below the control roller 28 and project upwardly toward the overlying projector construction. While this will inherently tend to raise the control roller mounting link or arm 80, it is contemplated that the over-center orientation of the entire linkage system be sufficient so as to maintain the drag producing brakeshoe engagement until such time as, and only if, the tension on the film, due to the pull exerted thereon by the projector drive sprocket, becomes excessive.

Figure 3:
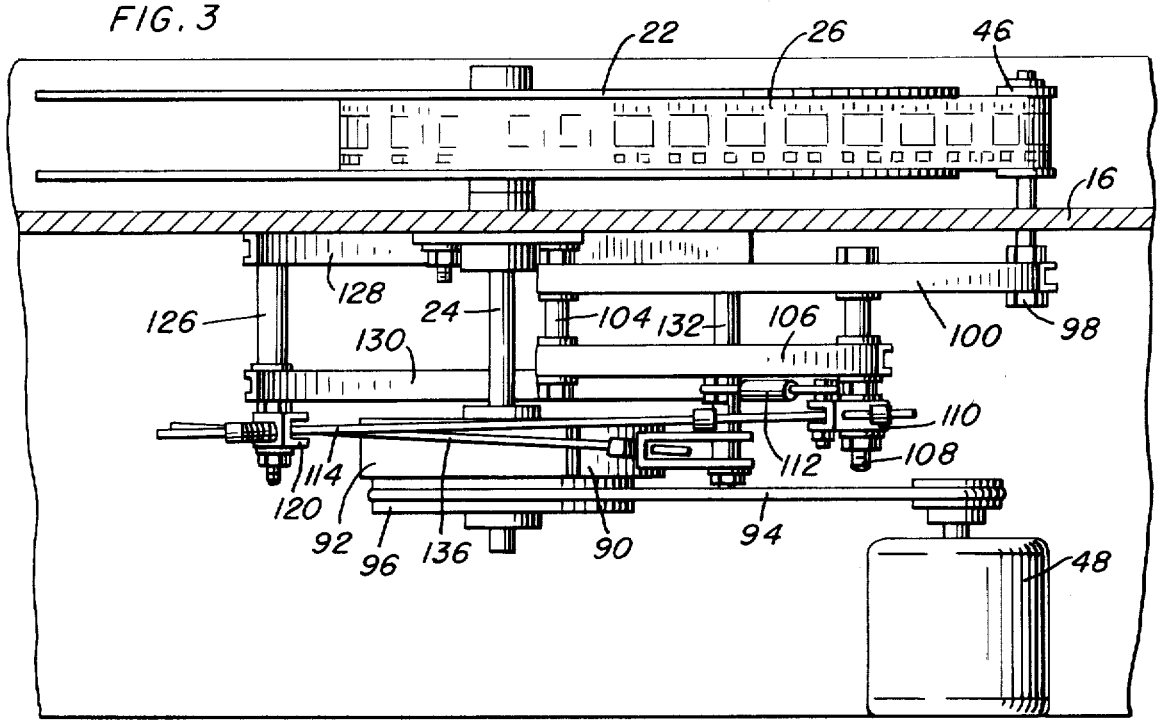
FIG. 3 is a top view of the take-up reel and associated control system.
Figure 4:
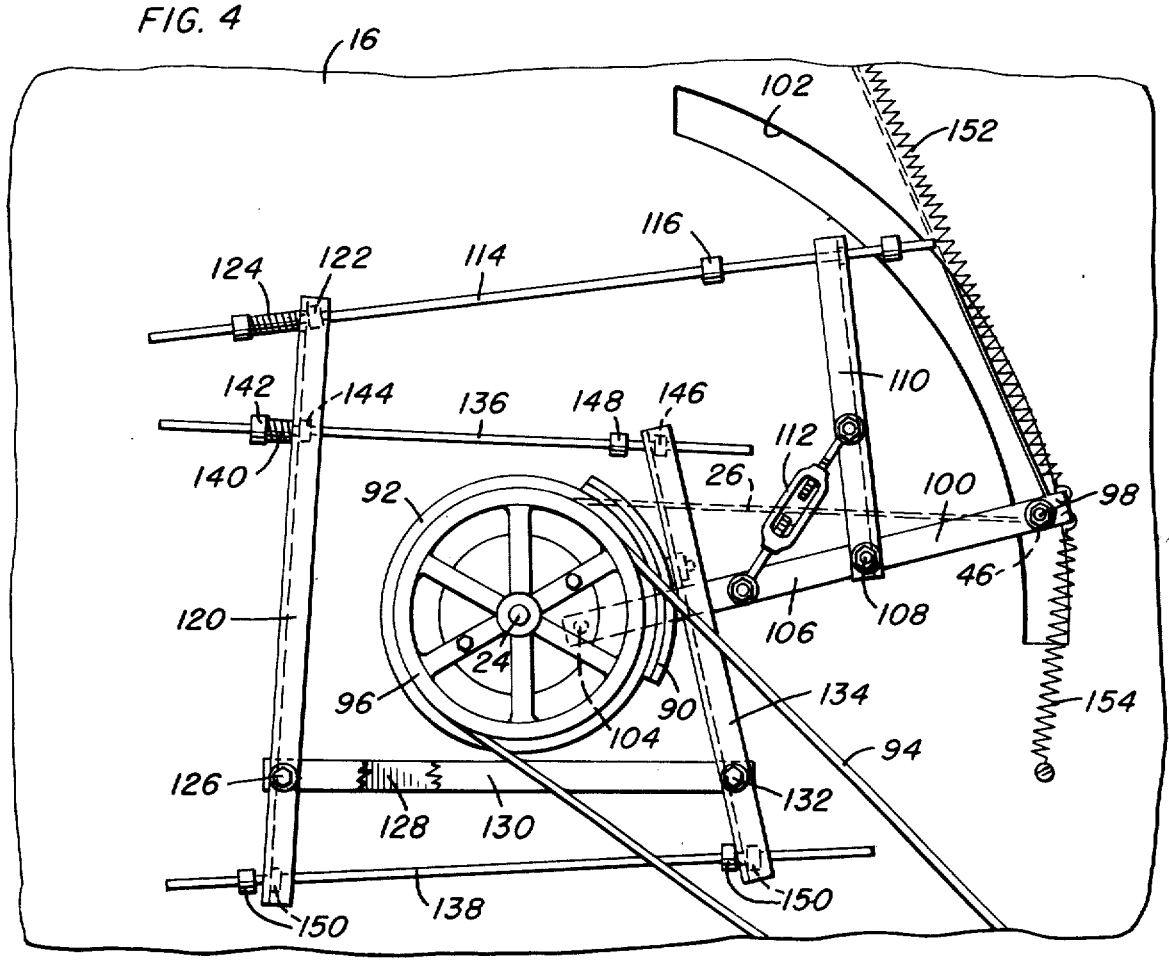
FIG. 4 is an elevational view detailing the linkage assembly of the control system associated with the take-up reel.

FIGS. 3 and 4 detail the specifics of the linkage assembly utilized to provide for the constant drag developed on the take-up reel 22 by engagement of the corresponding brakeshoe 90 with the corresponding friction wheel 92 mounted on the take-up reel shaft 24. This take-up reel assembly, being forward of the drive motor of the projector 14, is independently driven by the motor 48 through a continuous belt 94 preferably engaged about a 1-inch pulley on the motor drive shaft and 8-inch pulley 96 fixed to the reel shaft 24 or, as illustrated, directly bolted to the friction wheel 92 which is in turn fixed to the shaft. The constant drag on the friction wheel 92 is accommodated by a slipping of the belt 94. This belt 94 is preferably a leather belt which will be soaked in oil from 24 to 48 hours, and then stretched and applied. In this manner, it has been found that the belt will stay lubricated for the life of the belt and will provide the degree of slippage required by the constantly applied drag. The motor 48 itself will normally operate at 1725 rpm with the rpm of the take-up reel, due to the speed reduction effected by the pulleys and the constant drag, being approximately 200 rpm, to generally correspond to the speed of the film through the projector. However, other motors and pulley ratios can be used as required.

The control roller 46 associated with the take-up reel 22 is mounted, by shaft 98, on the outer end of a channel member elongated link or control arm 100. As will be appreciated, the control roller 46 is positioned to the front of the mounting or support base 16 while the link 100, as well as the remainder of the linkage system, is positioned to the rear of the support base 16. As such, an elongated arcuate slot 102 is provided through the base 16 so as to accommodate the roller shaft 98 and any anticipated movement thereof.

The link 100 extends radially inward relative to the shaft mounted friction wheel 92 and has the inner end thereof pivotally mounted by pivot post 104 at a point immediately adjacent the flanged bearing housing which mounts the shaft 24. This pivot post 104 in turn mounts a second channel member link 106 which is orientated in a spaced parallel relation to the link 100. The link 106 is a little longer than one-half the length of the link 100 with the outer end of the link 106 being affixed to the underlying link 100 by pivot post 108 which in turn pivotally mounts the lower end of vertical channel member link 110. An adjustable turnbuckle assembly 112 is provided so as to adjustably fix the angular relationship between the links 106 and 110 which in turn provides for an adjustment of the effective braking force applied.

The outer end of the link 110 includes an enlarged aperture therethrough which freely receives one end portion of an elongated rod link 114, which in turn mounts appropriate stop collars 116 and 118. The rod link 114 extends, generally parallel to the base 16, across the vertical plane of the reel shaft 24 and is received through an enlarged aperture in the upper end of a channel member link 120. The end portion of the link 114 is retained against excessive lateral movement relative to the link 120 by a stop collar 122 engaged with the inner face of the link 120 and a cushioning compression spring 124 engaged with the opposite face of the link 120.

The channel member link 120, in upwardly spaced relation from its lower end, is mounted on a pivot post 126. The pivot post 126 extends through and is mounted by a first channel member 128 fixed to the support base 16 and extending generally horizontally therealong below the reel shaft 24, and a second channel member 130 paralleling the channel member 128 in outwardly spaced parallel relation thereto. The remote ends of the members 128 and 130, to the opposite side of the vertical plane of the shaft 24 from the pivot post 126, mount a second pivot post 132.

The pivot post 132 engages through a channel member link 134 upwardly spaced from the lower end of the link 134 which extends generally vertically to the opposite side of the reel shaft 24 and wheel 92 from the link 120. This link 134 mounts the arcuate brakeshoe 90 for engagement against the friction wheel 92.

The upper and lower ends of the pivotally mounted link 134 are connected to the link 120 by rod links respectively designated as 136 and 138. Each of the rod links 136 and 138 extend through slightly enlarged apertures in the respective links 120 and 134 so as to allow for a pivotal movement therebetween. As will be noted, the upper rod link 136 engages through the link 120 below the upper end thereof. A compression spring 140, positioned by a stop collar 142, is mounted on the rod link 136 and engages against the face of the link 120 laterally outward of the wheel 92. A second stop collar 144 engages against the opposite side of the link 120. Appropriate stops 146 and 148 are also mounted on the rod link 136 to the opposite sides of the upper end of the link 134 with the stop 148 slightly spaced from the link 134 on the inner side thereof, that is the side mounting the brakeshoe 90, and with the stop 146 engaged directly against the opposite surface of the link 134.

With regard to the bottom rod link 138, it will be noted that appropriate stops or stop collars 150 are also provided to the opposite sides of both link 120 and link 134 to enhance the desired movement of the link 134 and associated brakeshoe 90 in conjunction with the controlled movement of the link 120.

A pair of generally oppositely directed tension springs 152 and 154 engage the outer or control roller mounting end of the control link or arm 100. The spring 152 biases the arm upward toward a position which, through the linkage assembly, engages the brakeshoe 90 against the friction wheel 92. The relatively slightly stronger spring 154 biases the control arm 100 downward toward a position disengaging the brakeshoe 90. The film 26, moving from the projector 14 to the power driven take-up reel 22, moves around and below the roller 46 and into wound engagement on the reel 22 with the inherently faster motor driven operation of the reel 22 causing a tensioning of the film 26 which translates into a slight lifting force on the roller 46 and outer end of the control arm, assisted by the spring 152. This slight raising of the control arm 100 engages the brakeshoe 90 and introduces a constant drag on the friction wheel 92 which is accommodated by the slippage of the lubricated leather belt 94, this slippage actually occurring at the drive pulley on the motor 48. It is contemplated that this engagement of the brakeshoe 90 and frictional drag be continuous throughout the film take-up and until such time as the end of the film is released from the projector, at which time the tension on the film is released and the spring 154 allowed to downwardly retract the control arm 100 and shift the brakeshoe 90 slightly, but sufficiently, so as to disengage from the friction wheel 92.

From the foregoing, it will be appreciated that both the feed reel assembly and the take-up reel assembly are provided with braking systems which produce a constant drag. This constant drag is in effect throughout the entire reeling or film transporting operation and only released, from the take-up reel, as the end of the film leaves the projector, at which point the tension thereon developed between the projector and the motor driven take-up reel is released. With regard to the feed reel, it is contemplated that, in normal operation, the constant drag does not release at any time. However, through the linkage assembly provided, including the control arm mounted roller, release or reduction of the brake producing drag can be effected should extreme tension develop within the film between the feed reel and the motor driven film pulling projector.

The system detailed herein is specifically intended to provide a unique although relatively simple arrangement for effectively providing for the transport of film of a substantial length between feed and take-up reels and through a projector whereby, as an example, a full length motion picture can be displayed without requiring the replacement of reels or the constant attendance of a projectionist.

The foregoing is illustrative of the principals of the invention, and as modifications and changes may occur to those skilled in the art, all suitable modifications and equivalents, falling within the scope of the invention as claimed, may be resorted to.

What is claimed as new:

1. A film transport system for use in conjunction with a projection system including motor driven film moving means, said transport system comprising a feed reel and a take-up reel, a first elongated feed reel shaft, means rotatably mounting said shaft, said feed reel being fixed to said shaft for rotation of the reel and shaft in response to the drawing of film therefrom by the film moving means of the projector, a friction wheel fixed to said shaft for rotation therewith, a first brakeshoe, a first pivotally mounted linkage assembly mounting and constantly biasing said shoe into drag producing engagement with said wheel, said linkage assembly including a first elongated arm urging said linkage assembly in first direction to engage said shoe with said wheel, a first film guide mounted on said arm and adapted to have film entrained thereabout in a manner whereby excess tension in the film will tend to urge said arm in a second direction opposite to said first direction toward relaxation of the shoe engagement with the wheel, a second rotatably mounted elongated shaft, said take-up reel being fixed to said second shaft for rotation therewith, a second friction wheel fixed to the second shaft for rotation therewith, drive means engaged with said second shaft for a driving thereof independently of the film moving means of the projector system, a second brakeshoe, a second pivotally mounted linkage assembly mounting said second brakeshoe, spring means biasing said second brakeshoe out of engagement with said second friction wheel, said second linkage assembly including an elongated second arm, a second film guide mounted on said second arm and adapted to have the film entrained thereabout in a manner whereby any pressure developed by the film against the second film guide will urge said second arm, and the remainder of the linkage assembly, against the biasing force of said spring means for retention of the second brakeshoe in constant engagement with the second friction wheel as film moves about said second film guide, said reels and associated friction wheels being vertically orientated and respectively mounted on horizontal shafts, said first elongated arm, associated with the feed reel, being pivotally mounted, adjacent the first shaft, and projecting radially outward therefrom for pivotal movement in a vertical plane, said first film guide being mounted on the outer end of said first arm, a generally vertically directed link pivoted to said first arm between the first shaft and the first film guide thereon, and projecting upwardly therefrom, a second vertically extending link positioned to the opposite side of said first shaft from said first link and pivotally mounted at a point below said first shaft for selective movement toward and away from said first shaft, said first brakeshoe being mounted on said second link in alignment with the first friction wheel for engagement therewith, and a third link pivotally interconnecting the upper ends of the first link and the second link for a movement of the second link, and brakeshoe thereon, in conjunction with a movement of the first link which in turn moves with said first arm.

2. The system of claim 1 including means for adjustably fixing the angular orientation between the first arm and the first link.

3. The system of claim 2 including a cushioning spring in force transmitting orientation between the third link and the second link, biasing said second link toward engagement of the associated brakeshoe with the first friction wheel.

4. The system of claim 1 including a first take-up reel link pivoted to said second arm between the second shaft and the second film guide and extending vertically therefrom, a second take-up reel link vertically orientated to the opposite side of the second shaft, said second take-up reel link being pivotally mounted below said second shaft and extending upwardly therefrom, a third take-up reel link pivotally mounted below said second shaft and extending generally generally vertically between said second shaft and said first take-up reel link, said third take-up reel link mounting said second brakeshoe for continuous biased engagement against said second friction wheel, a fourth take-up reel link pivotally interconnecting the first and second take-up reel links above said second shaft for pivotal movement of said second take-up reel link in conjunction with arm controlled movement of said first take-up link, and a fifth take-up reel link interconnecting the second and third take-up reel links for pivotal movement of said third take-up reel link in response to movement of the second take-up reel link.

5. The system of claim 4 wherein said drive means includes a motor, a drive pulley on said motor, a driven pulley on said second take-up reel shaft, and an endless belt engaged about said pulleys and capable of limited controlled slippage in response to development of a brake produced drag.

6. The system of claim 5 including spring means engaged between said take-up reel second link and the take-up reel fourth and fifth links respectively.

7. The system of claim 6 wherein said spring means biasing the second brakeshoe out of engagement with the second friction wheel includes a counter balancing spring force directed toward engagement of the second brakeshoe with said second friction wheel.

8. The system of claim 7 including means for adjustably fixing the angular orientation of the first take-up reel link and the associated second control arm.

* * * * *